Figure 1:
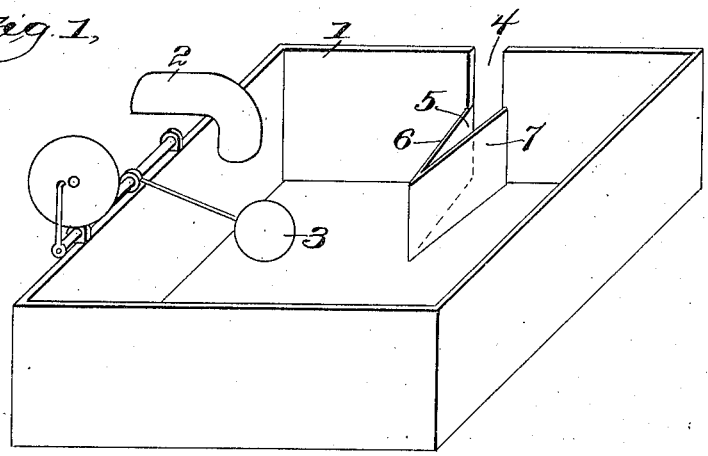

E. G. BAILEY.
LIQUID METER.
APPLICATION FILED AUG. 18, 1913.

1,243,682.

Patented Oct. 23, 1917.

Witnesses:
Jas. J. Maloney.
M. L. Maloney.

Inventor:
Ervin G. Bailey,
by his Attorney.

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

LIQUID-METER.

1,243,682. Specification of Letters Patent. Patented Oct. 23, 1917.

Application filed August 18, 1913. Serial No. 785,245.

*To all whom it may concern:*

Be it known that I, ERVIN G. BAILEY, a citizen of the United States, residing in Newton Highlands, Middlesex county, and State of Massachusetts, have invented an Improvement in Liquid-Meters, of which the following description, in connection with the accompanying drawings, is a specification, like letters on the drawings representing like parts.

The present invention relates to a liquid meter, and is embodied in a meter having a dam or obstruction provided with means for egress of the liquid therethrough, said means for egress consisting of an aperture or apertures, so shaped and located in the obstruction that the rate of flow of liquid through or past the obstruction will vary in any desired relation to the head producing the flow.

The invention is particularly useful in providing a simple and accurate meter, in which the rate of flow of liquid is directly proportional to the head, so that the readings which show the quantity of liquid may be readily averaged, or integrated, either directly, by means of a known type of integrating device, or from a chart record.

The rate of flow of liquid through apertures of standard form, such as rectangular, triangular, and trapezoidal weirs, also, the rate of flow through circular and other shaped orifices, follows certain general laws which are well known to the profession of hydraulic engineering. These general laws, such as, $$Q = a\sqrt{2gh} \text{ and } Q = \frac{2}{3}bh\sqrt{2gh},$$

(where $Q$ = rate of flow, $g$ = acceleration due to gravity, $h$ = head producing flow, $a$ = area of orifice and $b$ = width of rectangular weir,) which relate respectively to the rate of flow of liquid through an orifice (*i. e.* an opening wholly below the level of the surface of the liquid) and to a rectangular weir, do not include all factors which affect the rate of flow, for it is found, upon actual calibration of any of such means of egress at any head, that the actual discharge is only a fractional part of that which would be indicated by the foregoing formula. This fraction, usually expressed as a decimal, is called the "coefficient of discharge." A great deal of research work has been carried on to determine the co-efficients of discharge of various, easily reproducible standard shaped apertures such as those named above. All of the calibrations based on such work, however, show that the actual rate of flow does not vary in direct proportion to the head; so that readings of the head, covering a period of time, cannot be averaged for calculating the average rate of flow, nor can the readings be integrated by means of any of the usual forms of integrating devices.

The present invention involves the shape and arrangement of an aperture or apertures which form the means of egress of the liquid; the shape and character of the actual outlet being such that the rate of flow of liquid will be in direct proportion to the head, or, if desired, will follow any desired relation to the head that may be useful.

In accordance with my invention, therefore, I form the boundaries of the means of egress, so that the said means of egress consist substantially of a combination of one or more orifices in horizontal planes with one or more weir-notches in vertical or inclined planes, said orifices and notches being separate or connected, but in all cases being of such shapes and proportions that the actual rate of discharge through the entire aperture varies in any desired relation to the head. The relation between shape and area of that part of the aperture in the horizontal plane is made such that the "coefficient of discharge" is an important factor in accomplishing the desired relation between the rate of flow and head.

I am aware that weirs have been previously designed with a view to obtaining a rate of flow which is in a predetermined desired ratio to the head; but all of such weirs have openings which are wholly in a vertical plane, and the desired relation between flow and head, whether a simple or a complex ratio, has been obtained by curving the vertical boundaries of the opening. Such weirs may be made to measure accurately over a portion of their range; but, although the necessary curve can be theoretically plotted by mathematical formulæ, a variation from the expected ratio between head and flow is found to result from changes in the coefficient of discharge at different heads.

In order to make the weir measure accurately, therefore, even throughout the range in which it is possible, changes in the curve must be made with the aid of observations taken at different heads. Furthermore, after a weir of a certain capacity has been constructed, the same curve cannot be followed in constructing other weirs of greater or less capacity.

In accordance with my invention, on the contrary, I duly consider, when constructing my meter, the laws governing the coefficient of discharge through openings differing in shape, size and position, as well as the general laws relating to the flow of liquids; and by so doing am enabled to use apertures which are bounded by straight lines or arcs of circles, so that the apertures when made through walls having plane surfaces are easily reproducible.

To bring about this result, I locate part of the aperture in one plane, and part in another plane, the apertures being so arranged that the part in one plane constitutes what is technically known as an orifice, while the part in the other plane constitutes what is technically known as a weir-notch. In order to avoid objectional descriptive matter in the claims, I desire to state that by the term "orifice" I mean an opening which lies substantially in a horizontal plane and is therefore wholly below the level of the surface of the liquid when any material amount of liquid is flowing and that by the term "weir-notch" I mean an opening which is in a plane at an angle to the horizontal and is only partially and variably submerged when the meter is in operation.

In my meter, as in the meters of the prior art, the necessary shape and area of the entire means of egress must be finally determined by experimental calibration; but when the necessary shape and area of the orifice, relative to the shape and area of the weir has once been determined, the same relation will substantially hold good in meters of different capacities, so that uniformity is established which is of great advantage in the practical manufacture of the instruments. Furthermore, the meter can be constructed so that the reading will be substantially correct throughout the entire range.

Figure 2:
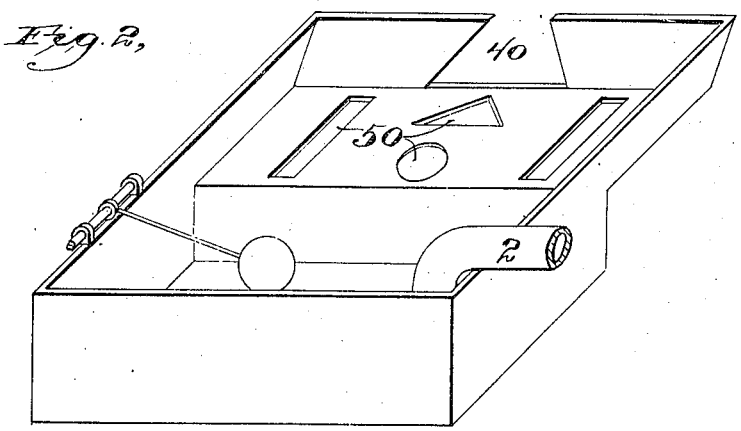
Figure 3:
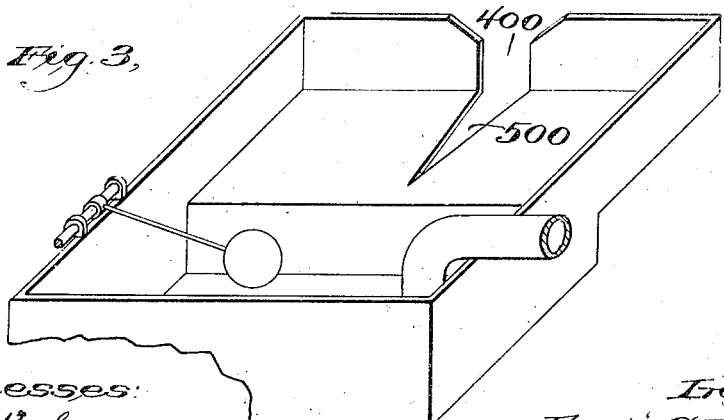

Figure 1 is a perspective view of a meter embodying the invention; and Figs. 2 and 3 are similar views showing modifications.

Referring to Fig. 1, the dam or obstruction consists of the walls 1 of a reservoir having an inlet pipe 2 for the liquid to be measured, and any suitable device for indicating the level of the liquid, such as a float 3.

The means of egress in this construction consist of the vertical, rectangular weir 4 and the horizontal triangular orifice 5, the latter being the space between the walls 6 and 7, which extend from the weir 4 into the reservoir.

It is practically impossible to express the design and proportion of the different parts of this aperture mathematically for the problem is not capable of a direct mathematical solution, owing largely to the very limited research work that has been done upon orifices of various shapes and sizes in horizontal plates at comparatively low heads, and the lack of knowledge of the exact mathematical laws governing the coefficient of discharge. The practical development of the problem must be carried out by actual experiment and the final design accepted will depend upon the end sought. If a meter of the general design of Fig. 1 is desired to have a rate of discharge that varies in direct proportion to the head, it must be constructed with any selected angle between intersecting plates 6 and 7, a selected width and height of weir opening 4 and an actual calibration made. If the calibration curve deviates from a straight line, the angle of the orifice or the width of the weir should be changed and another calibration made. Considerable data from such actual calibrations have been secured, the following being a set of eleven runs at different heads for a meter of this design;

| $h$ or head, inches. | $Q$ or cubic feet per second. | Cubic feet per second per 1-inch head. | Coefficient of discharge. |
|---|---|---|---|
| 0.407 | .039 | .0958 | .183 |
| 1.009 | .1067 | .1057 | .354 |
| 2.021 | .229 | .1133 | .432 |
| 2.859 | .324 | .1133 | .463 |
| 3.985 | .443 | .1112 | .485 |
| 3.992 | .443 | .1110 | .484 |
| 4.997 | .550 | .1101 | .491 |
| 5.990 | .660 | .1102 | .496 |
| 6.003 | .664 | .1106 | .499 |
| 8.000 | .910 | .1137 | .512 |
| 9.997 | 1.180 | .1180 | .522 |

In this case the width of the weir notch 4 was 3.99 inches and is termed $b$; the altitude or length of the triangular orifice 5, (assuming the boundary transverse to the direction of flow to be the base of the triangle) was 8.95 inches and is termed $a$; the head, or height of the surface of the liquid above the lowest point of egress varied from 0.407 to 9.997 inches, and is termed $h$.

The mathematical equation for the discharge of liquid through such an aperture can probably best be expressed by;

$$Q = c\sqrt{2gh}\left(\frac{ab}{2} + \frac{2}{3}bh\right)$$

in which $Q$ = rate of discharge in cubic feet per second.

$c$ = coefficient of discharge.

$g$ = acceleration due to gravity in feet per second.

$a$ = altitude or length of triangular orifice, in feet.

$b$ = base of triangular orifice and also width of rectangular weir, in feet.

$h$ = head of liquid over orifice and bottom of weir, in feet.

It is noted that the above equation is merely the combination of standard equations for the flow of liquid through an orifice having an area $\frac{ab}{2}$ and through a rectangular weir of width $b$, except $c$ is the coefficient of discharge of the combination. The coefficient has been calculated from the data of the calibration tests and it is noted that in this particular case it varies from .183 at the lowest head to .522 at the highest. If this coefficient were constant it would be absolutely impossible to even approach a simple ratio relation between head and rate of discharge, but the coefficient of discharge is not constant and it varies in such a manner that the rate of discharge per unit head is substantially constant as shown by the third column of the above data. From about 1½ to 8 inch heads the rate of discharge per inch head does not vary 2 per cent. from the average, and a meter which has this degree of accuracy over 80% of its capacity compares very favorably with the best of other types of meters now in general use. It is also quite possible to change the relation between $a$ and $b$ and thereby approach the desired result even closer than this, for the given case is only one particular design that was selected from preliminary calibration work. At any rate it is quite certain that the rate of discharge at the lower heads could be increased without materially affecting it at the higher heads by changing the orifice part from a single pointed triangle to a two or multipointed opening and thereby give more edge or perimeter for the discharge. For it is obvious that a star shaped orifice in a horizontal plate will have a higher coefficient of discharge at low heads than a circular orifice of the same area, while at higher heads the shape has little effect. This same end may be accomplished in modifying the design shown in Fig. 1, so that the orifice and weir do not join into one aperture, but are separated in a manner similar to that shown in Fig. 2; and numerous other modifications or designs could be worked out without departing from the present invention.

If the greatest accuracy is not necessary at the lowest heads a meter of the type shown in Fig. 1 will give a rate of flow substantially in direct proportion to the head when the altitude or length of the triangle is about 2¼ times the base, and the maximum capacity of the meter will be the rate of flow corresponding to a head of substantially two times the width of the weir.

It is obvious that by varying the relation between these dimensions or by varying the design or geometrical shape of the apertures, any desired relation between head and rate of flow may be secured between the limits of the laws governing the flow through simple orifices on the one hand and the V-notch on the other, and still not depart from the use of circular, triangular, rectangular, trapezoidal and other easily made and accurately reproducible shaped apertures. The advantage gained through the use of such apertures over curved edged weirs such as shown in Patents 1042097 to Englebright and 1067491 to Simmance and Abady is obvious, for in these the shapes of the curves can only be determined by actual calibration and prolonged experimentation and then the shape of the curve is different for different capacities; while I have found that with my present invention the same design holds good for a variety of capacities, it only being necessary to increase or diminish all dimensions proportionally.

While the meter shown in Fig. 1 is extremely simple and easy to construct, and is probably as practicable an embodiment of the invention as can be devised, such a construction is obviously not essential in carrying out the invention. For example, so long as the two components of means of egress lie in different planes, it is not essential that the planes should be respectively vertical and horizontal, and either component can be made up of more than one aperture if it is found to be expedient, and the apertures forming the entire means of egress are not necessarily connected.

In the construction shown in Fig. 2, for example, I have shown the weir 40, as trapezoidal in shape, and lying in a plane which is inclined from the vertical. The orifice 50 in this meter is shown as a plurality of openings of different shapes. In Fig. 3, a meter is shown in which the orifice 500 is triangular in shape, as in the meter shown in Fig. 1, the said orifice, however, consisting of an opening through a horizontal wall forming part of the dam. The weir 400 in this meter is shown as partly trapezoidal, this form of meter being especially adapted for use when the desired measurement depends upon a rate of flow which varies as some definite function of the head other than a simple ratio.

From the foregoing description, it will be seen that my invention is capable of wide and varied modifications dependent partly upon the particular use to which it is put; but in all cases the successful embodiment of the invention consists of a meter in which the sizes, shapes and positions of the apertures which constitute the means of egress, are determined in accordance with the laws of hydraulics, including those relating to the coefficient of discharge.

What I claim is:

1. In a liquid meter, an obstruction having as means for egress for the liquid a weir notch, the entire boundary of which lies wholly in the same plane, the said plane being approximately transverse to the direction of flow of the liquid; combined with an orifice, the boundary of which lies wholly in the same plane, said plane being approximately parallel to the direction of flow of the liquid; and means for measuring the height of the liquid at the upstream side of the obstruction.

2. A liquid meter comprising a horizontal obstructing surface, provided with a triangular shaped aperture having its altitude approximately two and one quarter times as great as its base; a vertical obstructing surface provided with a rectangular weir notch having a width substantially equal to the base of said triangular aperture and a height approximately twice its width; and means for measuring the height of the liquid at the upstream side of the obstruction.

In testimony whereof, I have signed my name to this specification in the presence of two subscribing witnesses.

ERVIN G. BAILEY.

Witnesses:
JAS. J. MALONEY,
M. L. MALONEY.